Figure 1:
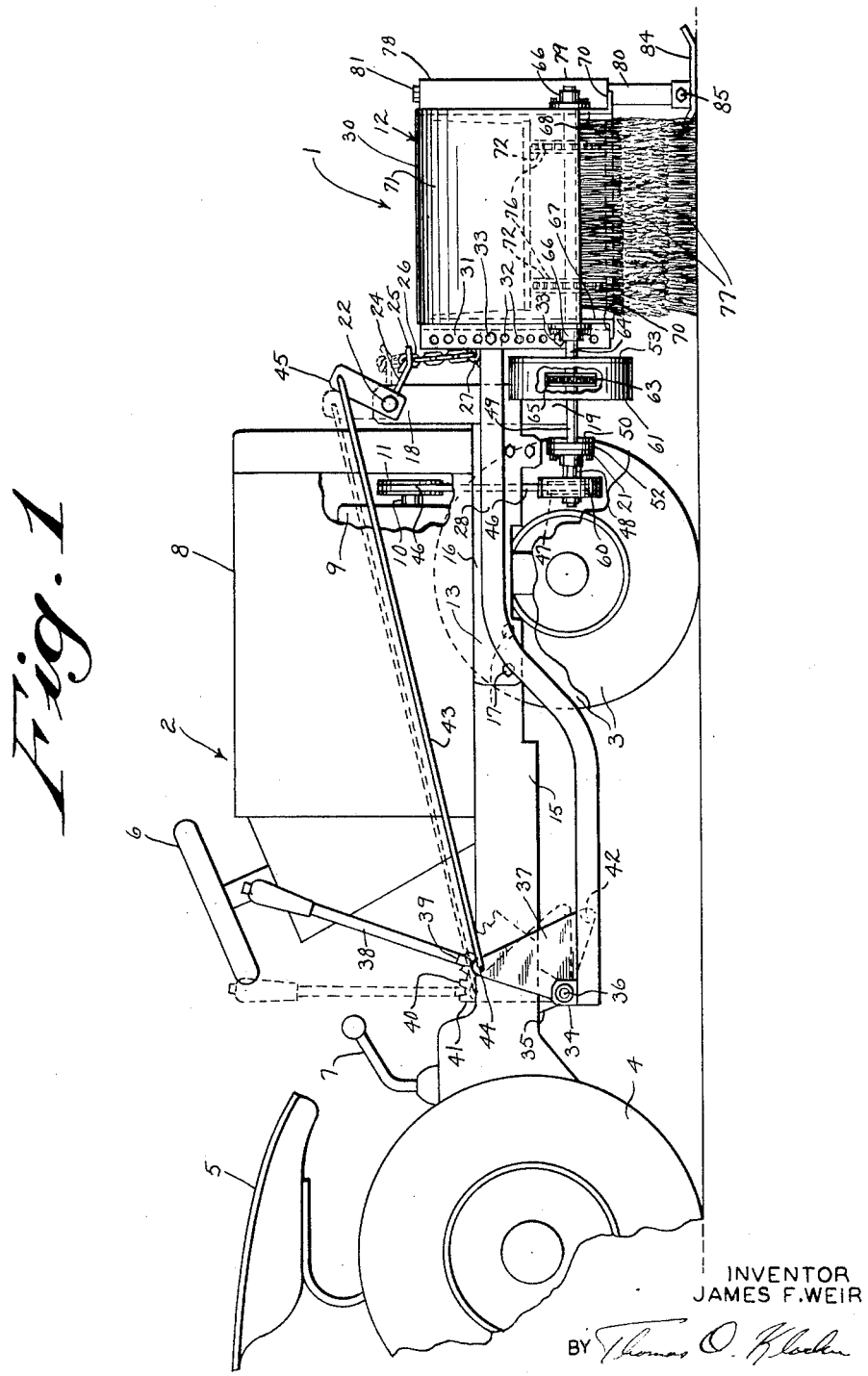

Nov. 17, 1964  J. F. WEIR  3,156,937
SWEEPER ATTACHMENT

Filed Nov. 9, 1962  5 Sheets-Sheet 1

INVENTOR
JAMES F. WEIR
BY Thomas O. Klocker
ATTORNEY

Nov. 17, 1964
J. F. WEIR
3,156,937
SWEEPER ATTACHMENT
Filed Nov. 9, 1962
5 Sheets-Sheet 3
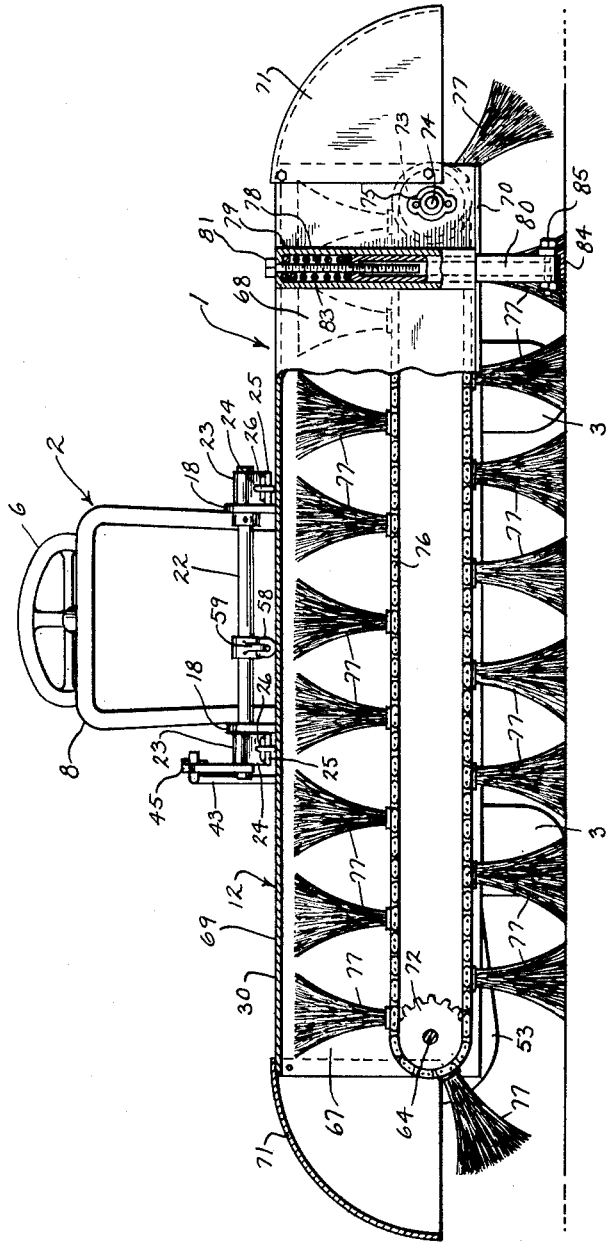
Fig. 3
INVENTOR
JAMES F. WEIR
ATTORNEY

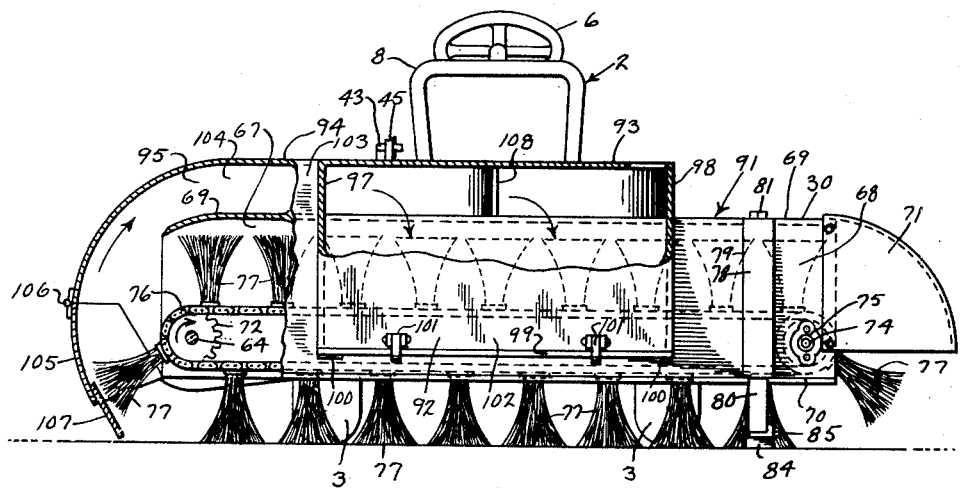
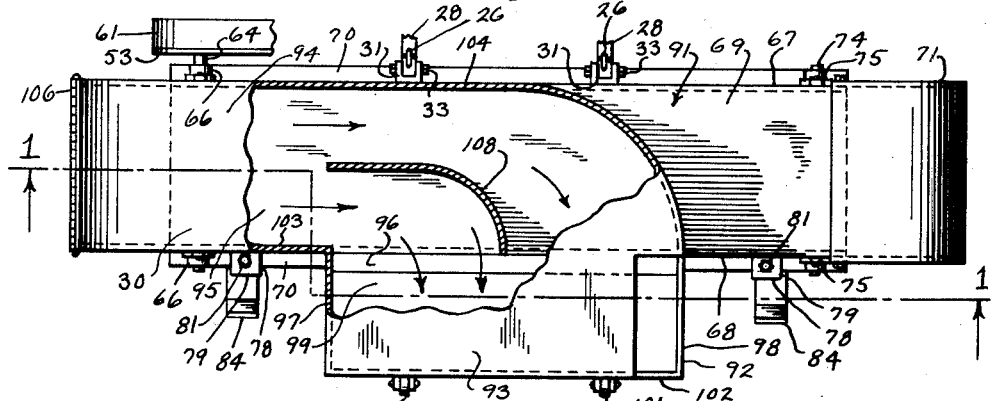
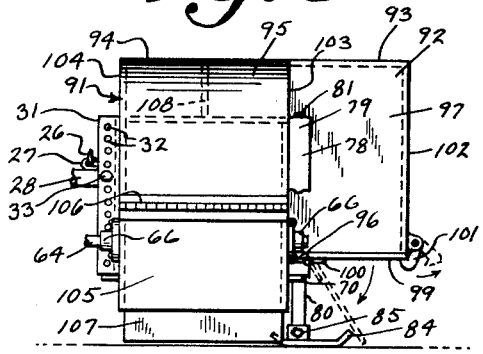
INVENTOR
JAMES F. WEIR
ATTORNEY

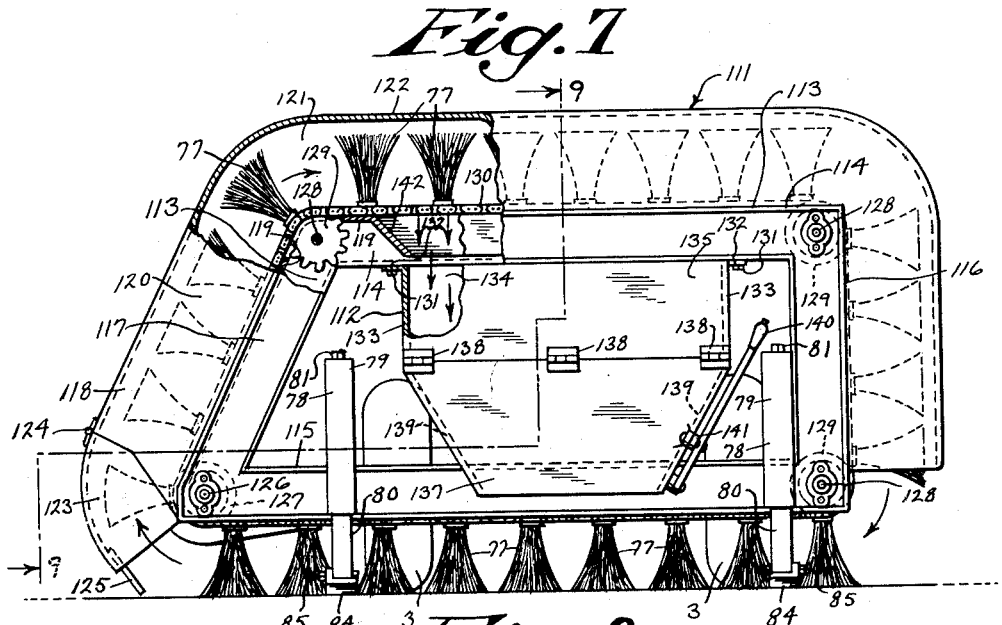
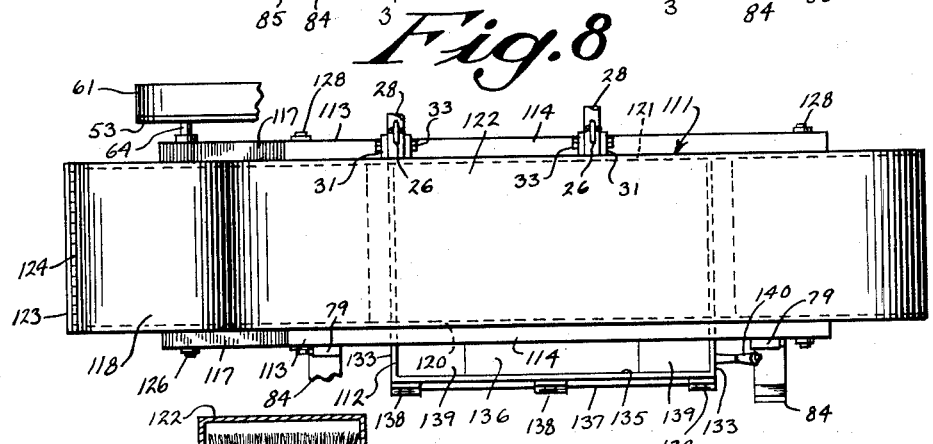
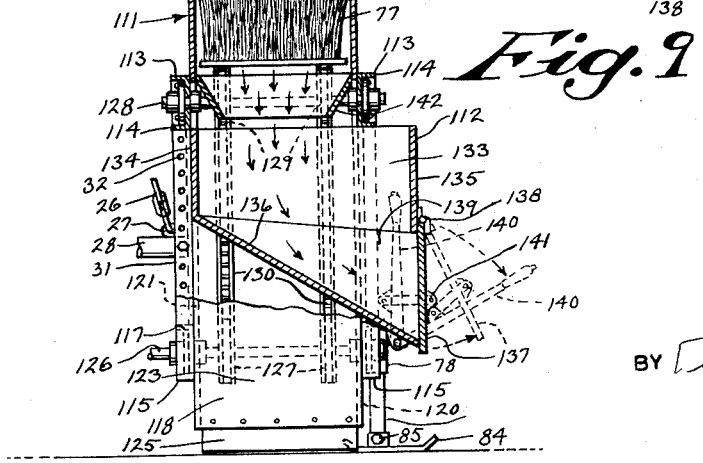

United States Patent Office 3,156,937
Patented Nov. 17, 1964

3,156,937
SWEEPER ATTACHMENT
James F. Weir, New Holstein, Wis., assignor to M-B Corporation, New Holstein, Wis., a corporation of Wisconsin
Filed Nov. 9, 1962, Ser. No. 236,651
5 Claims. (Cl. 15—80)

The present invention relates to a sweeper attachment for a tractor wherein the sweeper unit is comprised of an endless brush carrier having a plurality of brush elements mounted across its external periphery and being adapted to move through a path in a vertical plane across the tractor's line of travel to continuously brush debris to the side; a mounting means for mounting said brush unit to the tractor; and a drive means for driving said endless brush carrier in said sweeper unit.

In the past, sweeper attachments for tractors have commonly been of the rotary brush type. Usually such rotary brushes are mounted at an angle across the front of a tractor on a hydraulic lift device, and adapted to be driven from a power take-off on the tractor to rotate in a direction opposite to the forward motion of the tractor. Such sweeper attachments have several disadvantages. Generally, they are large, and hence they require a large tractor with costly and heavy hydraulic equipment to raise and lower the brush. As a result, such sweeper attachments are expensive and generally not economically justifiable except for use on very extensive areas. Secondly, such rotary type brushes are usable only when the tractor is moving in a forward direction. Third, such brushes are inefficient in that their operation involves sweeping debris from one side of the brush to another by repeatedly moving the debris by increments forwardly and to the side. This inefficiency is noticeable in the marked uneven wear of the brush element, indicating that an excessive amount of power is wasted in conveying debris to the side across the length of the brush.

According to the present invention those disadvantages may be avoided by the utilization of a belt-type sweeper, which consists of a continuous, endless brush carrier having a plurality of discrete brush elements mounted across its external surface. In the preferred embodiment of the invention, this sweeper unit is mounted across the front end of the tractor so that the continuous brush carrier rotates through a vertical plane, perpendicular to the tractor's line of travel. As a result, each increment of debris is handled only once and conveyed directly to the side. Moreover, the brush operates equally well whether the tractor is going forward or backward. Such a brush may be of very light construction, in itself inexpensive, to permit its use with very small size tractors, and obviating a need for powered means to raise and lower the sweeper unit. The brush may be fitted with its own auxiliary power unit or it may be driven from a power take-off on the tractor itself.

Accordingly it is an object of the present invention to provide a sweeper attachment for a tractor which may be adaptable for use in small areas.

It is another object of the present invention to provide an inexpensive sweeper attachment for a tractor which may be of small size.

It is another object of the present invention to provide a sweeper attachment which may be mounted on a stock tractor with a minimum modification of the tractor.

It is another object of the present invention to provide an efficiently operating sweeper attachment for a tractor.

It is another object of the present invention to provide a sweeper attachment which will perform its function whether the tractor is moving forward or backward.

It is another object of the present invention to provide a sweeper attachment for mounting on a tractor, which attachment may be raised or lowered by the tractor operator during operation.

It is another object of the present invention to provide a sweeper attachment for a tractor which sweeper attachment has a clutch adapted to automatically disengage when the attachment is raised and engage when the attachment is lowered.

It is another object of the present invention to provide a sweeper attachment for a tractor having a floating mounting to permit the sweeper attachment to follow the contour of the surface to be swept.

It is another object of the present invention to provide a sweeper attachment adjustably mounted on a tractor so as to permit vertical positioning of the attachment to compensate the wear of the brushes.

It is another object of the present invention to provide a sweeper attachment which is adapted to pick up debris from the surface to be swept and deposit the debris in a receptacle carried on the attachment.

It is another object of the present invention to provide for mounting on a tractor a sweeper attachment having a belt type brush.

The foregoing and other objects will appear in the description to follow. In the description, reference is made to the accompanying drawings which form a part hereof and in which there is shown by way of illustration several specific embodiments in which this invention may be practiced. These embodiments will be described in sufficient detail to enable those skilled in the art to practice this invention, but it is to be understood that other embodiments of the invention may be used and that structural changes may be made in the embodiments described without departing from the scope of the invention. Consequently, the following detailed description is not to be taken in a limiting sense; instead, the scope of the present invention is best defined by the appendant claims.

Figure 2:
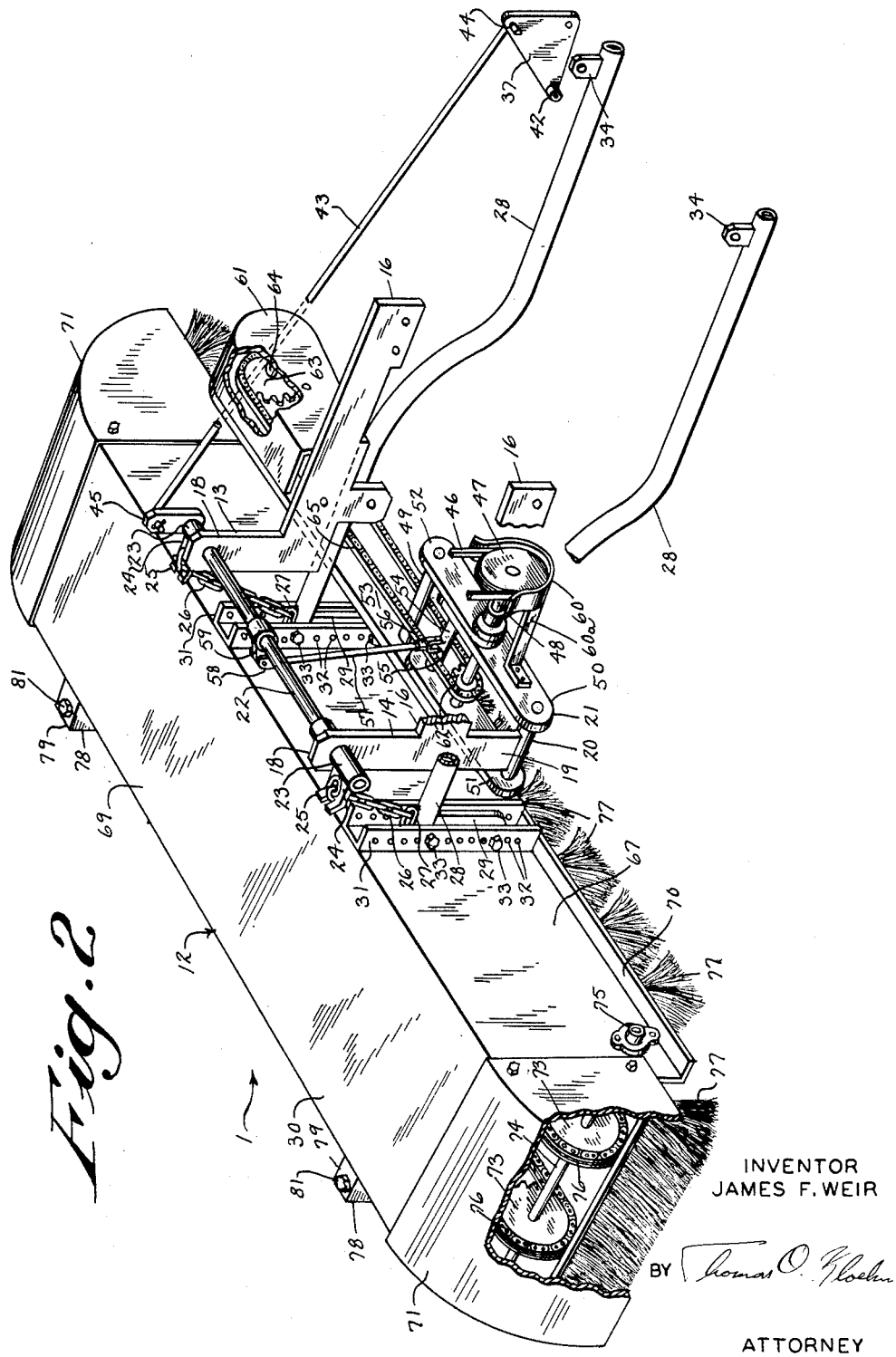

In the drawings:

FIG. 1 is a side view of a sweeper attachment embodying the present invention mounted on a tractor with portions cut away to reveal internal elements, FIG. 2 is a view in perspective of the embodiment of the present invention shown in FIG. 1 with portions cut away, FIG. 3 is a front elevation of the sweeper attachment shown in FIG. 1 with portions cut away to disclose internal elements, FIG. 4 is a front elevation of a second embodiment of the present invention partially in section along the line 1—1 in FIG. 5, FIG. 5 is a top plan view of the embodiment of the present invention shown in FIG. 4 with portions cut away, FIG. 6 is a side view in elevation of the embodiment of the invention shown in FIG. 4, FIG. 7 is a front elevation of a third embodiment of the present invention with portions cut away, FIG. 8 is a top plan view of the embodiment disclosed in FIG. 7, and FIG. 9 is a side view of the embodiment shown in FIG. 7 and has portions cut away to disclose internal elements.

Prefatory to the following description it may avoid confusion to note that when such words as "rear," "back," "front," "right" and "left" are used, the reference is to the vehicle, as illustrated in FIG. 1, and not necessarily the reader facing the drawings. Referring now specifically to the drawings, FIG. 1 shows a sweeper attachment 1 embodying the present invention mounted on a tractor 2. The tractor 2, as shown in the drawing, may be any one of the stock tractors readily available on the market. Portions of the tractor's front wheel 3 are cut away to expose elements which will be described later, and only a front portion of the rear wheel 4 appears in the drawing as being relevant to the following description. Just above the rear wheel 4 on the tractor 2 is an operator's seat 5, and a steering wheel 6 and shift stick 7 are shown in their usual locations in front of the operator's seat 5. A hood 8 enclosing the tractor's engine 9 appears in front of the steering wheel 6, and the hood 8 has portions cut away to disclose the front portion of the engine 9 with a drive shaft 10 having a sheave 11 mounted on it for a power take-off extending forward from the engine 9.

The sweeper attachment 1 is comprised, broadly, of a sweeper unit 12 and a variety of elements comprising an adjustable floating suspension system by which the sweeper unit 12 is supported. The suspension system is anchored to the tractor 2 by a pair of L-shaped mounting frames 13 and 14 fastened to the right and left sides of the tractor chassis 15, respectively. When the mounting frames 13 and 14 are in position, their horizontal beam portions 16 are fastened by mounting bolts 17 securely to the outside of the tractor chassis 15, so that their vertical post portions 18 extend upward a short distance in front of the tractor 2. The left mounting frame 14 is identical to the right mounting frame 13, except that the left frame 14 has a downward extension 19 of its vertical post 18 below its horizontal beam 16 to support a fixed rod 20 of a transmission frame 21.

A suspension bar 22 is rotatably mounted through the upper ends of the posts 18 of the mounting frames 13 and 14 across the front of the tractor 2. A hub 23 is mounted on each end of the suspension bar 22 outside of the posts 18, and each of the hubs 23 has a jib 24 extending forwardly from its surface. The free end of each jib 24 is cloven to present a pair of upwardly bent fingers 25, between which the links of a chain 26 may be wedged. The lower end of each chain 26 is linked to an eye 27 which is welded on top of a front end of a strut member 28. The strut members 28 extend rearwardly along each side of the tractor 2. A stabilizer 29 of steel bar stock extends perpendicularly downward from the front end of each strut member 28, and each stabilizer 29 has a mounting hole (not shown) through it in vertical alignment with a mounting hole (not shown) extending horizontally through the front end of its strut member 28.

A sweeper unit housing 30 which serves as a supporting frame and enclosure for the sweeper unit 12, has a pair of spaced, vertical channel brackets 31 welded to its rear surface. Each of the channel brackets 31 has a plurality of mounting holes 32 through each of its sides, each of the holes 32 in one side being aligned with a hole 32 in the opposite side. The front end of each strut member 28 with its stabilizer 29 is inserted between the sides of one of the channel brackets 31, and mounting bolts 33 are inserted through the mounting holes 32 in the channel members and the mounting hole in the front end of the strut member 28 and the mounting hole in the lower end of the stabilizer 29.

Each strut member 28 is formed from tube stock to have a short rearward declivity approximately midway between its ends so that when the sweeper attachment 1 is mounted on the tractor 2, the strut members 28 may extend rearwardly from the channel brackets 31, over the front axle (not shown) of the tractor 2, and then downwardly so that the rear ends of the strut members 28 are spaced somewhat beneath the tractor chassis 15. Adjacent the rear end of each strut member 28 a tab 34 made from bar stock extends upwardly. The tabs 34 are pivotally secured to lugs 35 extending from the underside of the chassis 15 in front of the rear wheels 4, by means of pins 36 which are journaled through the tabs 34 and their adjacent lugs 35.

A triangular crank plate 37, which is made from plate stock in the shape of a right triangle, is nonrotatably mounted at its apex on the pin 36, which is journaled through the tab 34 and lug 35 on the right side of the tractor 2. An operating lever 38 also is nonrotatably secured to the pin 36 at its lower end. The operating lever 38 is fitted with a spring catch 39, which is adapted to engage the spur teeth 40 on a rack 41, which is anchored to the tractor chassis 15. In the lower corner of the crank plate 37, which rides beneath the tractor chassis 15, is a cylindrical laterally projecting stop member 42. A connecting rod 43 has one end bent inward to hook through an aperture 44 in the upper corner of the crank plate 37, and its opposite end is bent inward to pass through a lift crank 45, which is secured to the end of the suspension bar 22.

Turning to the mechanism for transmitting power from the sheave 11 on the drive shaft 10 of the tractor 2 to the sweeper unit 12, a drive belt 46 connects the sheave 11 to a pulley 47, which is suspended below the front of the tractor chassis 15. The pulley 47 is on a transmission shaft 48 which is journaled through two side pieces 50 and 51 of the transmission frame 21, and through a chain guard shaft support 52, and a chain guard base plate 53 which are united by a tie bar 49 to straddle a free end of the transmission frame 21. The fixed end rod 20 is journaled in the side members 50 and 51 to form a fixed end of the transmission frame 21, and an end rod 54 is journaled in the side members 50 and 51 to form a free end of the transmission frame 21 between the chain guard base plate 53 and the chain guard shaft support 52. The end rod 54 has an eye 55 projecting upward and pin-fastened between a forked fitting 56 on a lower end of a link 57. The upper end of the link 57 also has a forked fitting 58 which is pin-fastened to a clutch lever 59 mounted on the suspension shaft 22. A belt lifter 60 is fashioned from a strip of sheet steel to fit about the outside of the drive belt 46 as the drive belt 46 passes beneath the drive pulley 47, and the belt lifter 60 is held in place beneath the drive pulley 47 by a steel strap 60a which is anchored to the rear side member 50 of the transmission frame 21.

A chain guard shroud 61 is fastened to the periphery of the chain guard base plate 53. A transmission sprocket 62 is mounted on the transmission shaft 48 inside the transmission frame 21. A chain gear 63 is mounted on an end of a drive axle 64 inside the chain guard shroud 61, and a drive chain 65 passes around and engages the teeth of the transmission sprocket 62 and chain gear 63.

The drive axle 64, on which the chain gear 63 is mounted, passes through the sweeper unit housing 30 and is journaled in bearings 66 mounted in the rear wall 67 and front wall 68 of the housing 30. The housing 30 is constructed of sheet steel in the form of an inverted channel with a flat top wall 69. Outwardly extending flanges 70 are formed on the bottom edges of the front and rear side walls 68 and 67, respectively, to lend structural rigidity to the housing 30. Fenders 71 are fastened to the ends of the housing 30 to close off the ends of the housing 30.

Inside the housing 30, a pair of drive sprocket wheels 72 are mounted on the drive axle 64 in alignment with a pair of idler sprocket wheels 73 mounted inside the left end of the housing 30 on an idler axle 74, which has its ends journaled in bearings 75 mounted in the front and rear walls 68 and 67, respectively. Sweeper chains 76 pass around and engage the aligned drive sprocket wheels 72 and idler sprocket wheels 73. The two sweeper chains 76 function together as an endless "brush carrier," across the external periphery of which a plurality of brush elements 77 are mounted at spaced intervals.

On the outside of the front wall 68 of the sweeper unit housing 30, a pair of shock absorbers 78 are vertically mounted. The shock absorbers 78 consist of telescoping tubular members 79 and 80. Adjusting screws 81 pass through apertures in the top of the upper, external tubing member 79 of the shock absorbers 78, and they are threaded through tapped apertures in the top of the lower internal tubular member 80 to permit adjustment of the maximum length of the shock absorbers 78. Coil springs 83 are fitted inside the external tubular member 79 about the adjusting screw 81 to bear upward against the inside of the top of the external tubular member 79 and downward against the outside of the top of the internal tubular member 80. Skid shoes 84 are pivotally fastened to the bottoms of the internal tubular members 80 by means of mounting bolts 85.

To operate the sweeper attachment 1 described above, the mounting frames 13 and 14 must be securely bolted into position on the sides of the tractor chassis 15. The rear ends of the strut members 28 are pivotally suspended from the pins 36 through the tabs 34 and the lugs 35, and the operating lever 38 and triangular crank plate 37 are mounted on the pin 36 on the right side of the tractor 2. The sweeper unit 12 is then set at the desired height, which may depend upon the bristle length of the brush elements 77. Mounting bolts 33 may then be inserted in the appropriate mounting holes 32 on the channel brackets 31 aligned with the mounting holes in the front ends of the strut members 28 and the mounting holes in the stabilizers 29. The chains 26 are then wedged between the fingers 25 on the jibs 24 to suspend the sweeper unit 12 from the suspension bar 22. The connecting rod 43 is inserted in the position, connecting the lift crank 45 on the suspension bar 22 to the triangular crank plate 37, which is connected to pivot with the operating lever 38. Then the adjusting screws 81 may be set so that the skid shoes 84 rest on the surface to be swept. The drive belt 46 may then be placed in position, connecting sheave 11 with the pulley 47.

When the operating lever 38, and thus the triangular crank plate 37 are pulled back to their rearmost position, where the stop member 42 on the crank plate 37 abuts the bottom of the tractor chassis 15, the connecting rod 43 pulls the upper end of the lift crank 45 to the rear. Since the lift crank 45, the suspension bar 22, jibs 24 and the clutch lever 59 are mounted together to move as a unit, the rearward movement of the upper end of the lift crank 45 causes the suspension bar 22, as viewed in FIG. 1, to rotate in a counterclockwise direction, simultaneously lifting the chains 26 in the fingers 25 on the jibs 24 and the link 57 on the clutch lever 59. The simultaneous lifting of the chains 26 and the link 57, raises the sweeper unit 12 and lifts the free end rod 54 of the transmission frame 21, pivoting the transmission frame 21 about the fixed end member 20. The lifting of the transmission frame 21 raises the transmission shaft 48 with its drive pully 47 and the belt lifter 60 relative to the sheave 11 on the drive shaft 10 of the tractor 2. Hence, as the sweeper unit 12 is raised away from contact with the surface to be swept, the drive pulley 47 is raised away from operational contact with the inside surface of the drive belt 46 and the belt lifter 60 rises to engage the outside surface of the drive belt 46.

When the belt lifter 60 engages the outside surface of the drive belt 46 and continues to move upward, it lifts the drive belt 46 out of operational contact with the sheave 11 on the drive shaft 10, which may be turning at a sufficiently high speed to throw off the drive belt 46 if it were permitted to lie slack on the sheave 11 after the drive pulley 47 is lifted. Since the end rod 54 of the transmission frame 21 is more remote than the transmission shaft 48 from the pivot point of the transmission 21 about its fixed end rod 20, the end rod 54 rises a greater distance than the transmission shaft 48 and the drive chain 65 about the transmission sprocket 62 on the transmission shaft 48. However, since the sweeper unit 12 and hence the chain gear 63 and drive chain 65 are raised and lowered simultaneously with the transmission frame 21, the end rod 54 will not be limited in its movement by the drive chain 65 above and below it.

Thus, by a single operation on the part of the person driving the tractor 2, the sweeper unit 12 is lifted away from the surface and disengaged from its power source. By the reverse operation, viz. pushing the operating lever 38 forward, the person operating the tractor may lower the sweeper unit 12 to a surface to be swept and simultaneously re-engage it with its power source. This operational feature of the present invention ensures that when the sweeper attachment 1 on a moving tractor 2 is not being used, the sweeper unit 12 is rendered safely inoperative.

When it is desired to begin sweeping, the spring catch 39 on the operating lever 38 may be released, and the operating lever 38 may be pushed forward, lowering the sweeper unit 12. When the sweeper unit 12 reaches its lowest point, the drive belt 46 will be in operative engagement with the sheave 11 and the endless brush belt, comprised of the sweeper chains 76, is driven so that its brush elements 77 will sweep all debris on the surface to be swept to one side. The skid shoes 84 will follow the contour of the surface being swept, causing the sweeper unit 12 to raise or lower as is necessary to avoid obstacles while maintaining the brush elements 77 in contact with the surface to be swept.

The chain guard base plate 53 performs the essential function of maintaining a constant distance between the transmission sprocket 62 on the transmission shaft 48 and the chain gear 63 on the drive axle 64 of the sweeper unit 12, throughout all of the movements of the sweeper unit 12 relative to the tractor 2. The chain guard, of necessity, prevents endwise motion of the sweeper unit 12 relative to the tractor 2 to maintain proper tension in the drive chain 65, and secure the sweeper unit 12 against the force of the brush elements 77 sweeping across the surface to be swept.

The other forces acting upon the sweeper unit 12 are sustained by different elements of the suspension system. As the tractor 2 with the sweeper attachment 1 moves forward, the rearward force against the sweeper unit 12 is sustained by the strut members 28, since the sweeper unit 12 is otherwise freely suspended upon the chains 26. The strut members 28 are made as long as practicable so that the movement of the sweeper unit 12 as it is lifted through the arc about the pins 36 will approach as close as possible to a linear, vertical path. The stabilizers 29 sustain the torsional forces exerted upon the suspended sweeper unit 12 as the lower extremities of the brush elements 77 are moved forward or backward over a surface. By this floating type of mounting, the sweeper unit 12 is permitted to raise and lower as required by the contour of the surface to be swept while being held rigidly in place against the various other forces exerted upon it, and effective sweeping action is achieved. The same suspension system is used in the second and third embodiments of the present invention to be described, and hence a discussion of it will not be repeated there.

A second embodiment of the present invention is illustrated in FIGS. 4, 5 and 6, and it has many elements, including the entire suspension system, which are identical to those in the first embodiment. Such identical elements will be given the same reference numerals used in describing the first embodiment, as shown in FIGS. 1, 2 and 3. Only the elements peculiar to the second embodiment will receive different reference numerals.

Referring now specifically to the drawing containing FIGS. 4, 5 and 6, a sweeper unit 91 is shown carrying a debris receptacle 92 centered in front of it. The sweeper unit 91 has a housing 30 constructed of sheet metal in the shape of an inverted channel, with a front wall 68, and rear wall 67 joined by a top wall 69, as in the first embodiment. The bottom edges of the front and rear walls 68 and 67 have flanges 70 extending outward therefrom to lend rigidity to the structure. A fender 71 closes off the left end of the housing 30.

The debris receptacle 92 is constructed of sheet steel in the shape of a rectangular box with an open back, and it is welded in place on the center of the front wall 68 of the housing 30 so that its top 93 is flush with a ceiling 94 of a debris duct 95, which passes over the top wall 69 of the housing 30. A narrow shelf 96, which is welded to the front wall 68 of the housing 30, joins right and left sides 97 and 98, respectively, of the debris receptacle 92. A dumping door 99 is mounted on hinges 100 on the front edge of the shelf 96. A pair of hook latches 101 on a front panel 102 of the debris receptacle 92 hold the dumping door 99 in its closed position.

The debris duct 95 is formed over the right end of, and the right portion of the top wall 69 of the housing 30. The debris duct 95 has a front side 103 which extends from the right end and top of the front wall 68 of the housing 30 to the right side 97 of the debris receptacle 92, to which it is joined. A rear side 104 of the debris duct 95 extends parallel to the front side 103 from the right end and top of the rear wall 67 of the housing 30 to a point about midway between the ends of the housing 30 where it curves forward in an arc across the top wall 69 of the housing 30 to the left side 98 of the debris receptacle 92, to which it is joined. The ceiling 94 of the debris duct 95 is joined to the top edges of the front and rear sides 103 and 104 and curves downward over the upper portion of the open right end of the housing 30.

A debris catcher 105 is suspended on hinges 106 from the right end of the ceiling 94 of the debris duct 95, in effect extending the duct 95 downward over the entire open end of the housing 30. A flexible wiper flap 107 is suspended from the bottom of the debris catcher 105 to the surface to be swept. Inside the debris duct 95, a baffle 108 is secured between the ceiling 94 and the top wall 69 of the housing 30, beginning at a point approximately in the center of the duct 95 in line with the right side 97 of debris receptacle 92, and curving forward to terminate at the front wall 68 of the housing 30 midway between the right and left sides 97 and 98 of the debris receptacle 92.

This second embodiment may be operated either with or without the pick-up feature utilizing the debris receptacle 92. However, for optimum operation of the pick-up function the speed of the brush elements 77 must be somewhat higher than is necessary without the pick-up function. The pick-up function operates when the debris catcher 105 is in its lowered position with the wiper flap 107 next to the surface to be swept. The rapidly moving brush elements 77 drive the debris from the surface to be swept upward and against the wiper flap 107 and debris catcher 105 as the brush elements 77 complete their sweep stroke. The wiper flap 107, debris catcher 105 and ceiling 94 of the debris duct 95 deflect the debris into the duct. The momentum imparted to the debris by the brush elements 77, carries the debris through the duct 95 until it strikes the baffle 108 or the curved portion of the rear side 104 of the duct 95, which deflects the debris forward into the debris receptacle 92. The debris receptacle 92 may be emptied by releasing the hook latches 101 to permit the dumping door 99 to fall open. The sweeper unit 91 may be operated without the pick-up function, as may be desired for snow removal uses, for example, by pivoting the debris catcher 105 upward about its hinges 106 out of the path of the debris. Then the debris will not be deflected into the debris duct 95, but will be cast outward through the open end.

A third embodiment of the present invention is illustrated in FIGS. 7, 8 and 9. In this third embodiment of the invention, while the sweeper unit 111 is structurally different from the other two embodiments, its mounting means and drive means are the same. Therefore, the following discussion will center about the structure of the sweeper unit 111 with its novel, open-top, debris receptacle 112.

The sweeper unit 111 is constructed about a pair of vertical trapezoidal frames 113 which have horizontal top and bottom members 114 and 115, vertical left side members 116 and inward slanting right side members 117. The trapezoidal frames 113 support a brush conduit 118 on the outside of their side members 116 and 117 and top member 114. The brush conduit 118 has a floor 119 of steel plate which lies between and is integrally attached to the two trapezoidal frames 113, a front side wall 120, a rear side wall 121 and a flat top wall 122. The floor 119 of the brush conduit is interrupted between the top members 114 of the trapezoidal frames 113, and baffle plates 142 slant downward and inward from the ends of the floor 119 to the open top of the debris receptacle 112. A debris catcher 123 is suspended from the right end of the top wall 122 on hinges 124. The debris catcher 123 has a flexible wiper flap 125 secured to its bottom edge and extending downward to the surface to be swept, and a pair of shock absorbers 78 are vertically mounted along the front of the forward trapezoidal frame 113 to guide the sweeper unit 111 over the contours of the surface to be swept.

A drive axle 126 with a pair of sprockets 127 mounted on it has its ends journaled in the lower left corner of the trapezoidal frames 113, and there is an idler axle 128 with idler sprockets 129 mounted on it journaled in each of the remaining three corners of the trapezoidal frame pieces 113. A pair of sweeper chains 130 are passed around the drive sprockets 127 and idler sprockets 129 to form an endless brush carrier on which are mounted at spaced intervals a plurality of brush elements 77. The drive axle 126 is connected to the power take-off of the tractor 2 by the same transmission means as was described in connection with the first embodiment of the present invention.

The debris receptacle 112 has vertical sides 133, a vertical rear side 134, and a vertical front side 135. The debris receptacle 112 is suspended from the top members 114 of trapezoidal frames 113 by means of bolts 131 passing through flanges 132 extending outward from the top edges of the vertical sides 133 of the debris receptacle 112. A bottom 136 for the debris receptacle 112 slopes downward and forward from the lower edge of the rear side 134, and its lateral edges converge toward each other from its back end to its front end. The front end of the bottom 136 lies below the front side 135, both of which protrude from the front of the sweeper unit 111. A dumping door 137 is suspended from the front side 135 on hinges 138. A pair of triangular panels 139 slant inward from the lower edges of the vertical sides 133 to be joined to the downward slanting bottom 136 of the receptacle 112. A dumping lever 140 is pivotally mounted beneath the lower front end of the sloping bottom 136 of the receptacle 112, and it extends upward adjacent the triangular panel 139 on the left side to provide lever operation of a dumping door latch 141.

In operation, the brush elements 77 move up along the inward slanting right side members 117 of the trapezoidal frames 113, they carry the debris from the surface being swept through the brush conduit 118 over the baffle plates 142 and the open top of the debris receptacle 112 where the debris falls down through the brush elements 77, as shown by the arrows, into the receptacle 112. When the debris receptacle 112 is full, it may be emptied by pulling the dumping lever 140 forward to open the dumping door 137. The debris will slide down the sloping bottom 136 and out of the debris receptacle 112. If it is desired to use the sweeper unit 111 without picking up the debris, the debris catcher 123 may be pivoted upward and back against the top wall 122 of the brush conduit 118 so that the debris may be swept directly out to the side instead of up through the conduit 118.

While the above disclosures were set forth in detail, the invention is not limited to the precise construction set out there. For example, it will be apparent to one skilled in the art that instead of driving the sweeper units 12, 91 or 111 from a power take-off on the tractor 2, a separate power source may be used, such as a small gasoline engine which could be conveniently mounted on the top wall 69 of the housing 32, or the top of the debris duct 95, or the top wall 122 of the brush conduit 118. Also, more or fewer than two sweeper chains 76 or 130 may be used, or an endless strip of a suitable belting material may be substituted for chains 76 or 130 and used with rolls or pulleys instead of sprockets 72, 73 and 127, 129. While the preferred embodiments disclosed mount the sweeper attachment 1 in front of the tractor 2, it is feasible to mount it behind, to one side of or beneath the tractor also. Similarly, throughout the disclosure well known equivalents may be substituted for the preferred components described without materially changing the modus operandi of the sweeper attachment, and it is understood that such variations fall within the scope of the present invention as set forth in the claims below.

I claim:

1. In a sweeper attachment for a tractor, the combination comprising:
   a mounting frame adapted to be fastened to the front of said tractor's chassis;
   a sweeper unit suspension bar rotatably mounted in said frame across the front of said tractor;
   a transmission frame having one end pivotally mounted to said mounting frame, extending across the front of said tractor below said suspension bar, and having its opposite end supported from said suspension bar to be raised or lowered by said suspension bar's rotation;
   a transmission shaft journaled in said transmission frame, having a pulley at one end to receive motive power from said tractor's motor and a sprocket on its other end to impart motive power to a drive chain;
   a sweeper unit having an endless brush carrier mounted to travel in a path in a substantially vertical plane across the front of said tractor, suspended from said suspension bar to be raised or lowered by said suspension bar's rotation, and having a sprocket means connected to receive motive power from said drive chain to move said endless brush carrier;
   a rigid chain guard partially enclosing said drive chain, and having one end pivotally secured around said sprocket means on said sweeper unit and its other end pivotally secured around said sprocket on said transmission shaft to maintain proper drive chain tension.

2. In a sweeper attachment for a tractor, the combination comprising:
   a sweeper unit,
   a suspension system for attaching said sweeper unit to said tractor and adapted to permit said sweeper unit to be raised and lowered;
   a drive means for said sweeper unit including a transmission frame mounted on said suspension system, a transmission shaft journaled in said transmission frame with a pulley mounted on one end and a sprocket on its other end, a power take-off on said tractor with a sheave aligned with said pulley, a drive belt connecting said pulley to said sheave, means for engaging and disengaging said belt from said sheave as said sweeper unit is respectively lowered and raised, a drive chain adapted to transmit power from said sprocket on said transmission shaft to a chain gear on a drive axle in said sweeper unit, and a chain guard about said drive chain and pivotally mounted about said transmission shaft and said drive axle to maintain a constant distance therebetween.

3. In a sweeper attachment for a tractor, the combination comprising:
   a suspension system adapted to be fastened to said tractor;
   a sweeper unit supported by said suspension system and having a continuous brush carrier mounted to move through a path in a substantially vertical plane across a line of travel of said tractor, and a plurality of brush elements mounted across the periphery of said endless brush carrier so as to sweep debris from a surface;
   powered means for driving said endless brush carrier;
   a debris receptacle mounted on said sweeper unit and adapted to receive debris;
   a debris duct extending from a point adjacent an end of a sweeping stroke of said brush elements to said debris receptacle to guide debris impelled by said brush elements over said sweeper unit into said debris receptacle.

4. In a sweeper attachment for a tractor, the combination comprising:
   a suspension system adapted to be fastened to said tractor;
   a sweeper unit supported by said suspension system and having a vertically oriented frame defining a substantial enclosed area;
   an endless brush carrier mounted about said frame to move through a path across a line of travel of said tractor and having a plurality of brush elements extending outward from its periphery to sweep debris from a surface;
   a debris receptacle mounted in said enclosed area defined by said frame and adapted to receive debris swept from the surface by said brush elements.

5. In a sweeper attachment for a tractor, the combination comprising:
   a mounting frame adapted to be fastened to said tractor's chassis, and having a sweeper unit suspension bar rotatably mounted in said frame across a longitudinal axis of said tractor;
   a transmission frame having one end pivotally mounted to said mounting frame, extending across said longitudinal axis of said tractor below said suspension bar, and having its opposite end supported from said suspension bar to be raised or lowered by said suspension bar's rotation;
   a transmission shaft journaled in said transmission frame, having a pulley at one end to receive a drive belt driven by a power take-off on said tractor;
   a belt lifter mounted on said transmission frame beneath said pulley to engage said drive belt when said transmission frame is raised and to lift said drive belt out of operational contact with said power take-off on the tractor;
   a sweeper unit suspended across said longitudinal axis of said tractor from said suspension bar to be raised or lowered by said suspension bar's rotation and having a driven axle to receive motive power for operating said sweeper unit;
   and means for conveying motive power from said transmission shaft to said driven axle in said sweeper unit.

References Cited in the file of this patent

UNITED STATES PATENTS

| 1,215,078 | Thiesfeld | Feb. 6, 1917 |
| 2,212,677 | Wagner | Aug. 27, 1940 |
| 2,330,025 | Bentley et al. | Sept. 21, 1943 |
| 2,727,350 | Kuhlman | Dec. 20, 1955 |

FOREIGN PATENTS

| 875,144 | Great Britain | Aug. 16, 1961 |